United States Patent
Ono

(10) Patent No.: US 11,374,608 B2
(45) Date of Patent: Jun. 28, 2022

(54) RADIO-FREQUENCY FRONT-END CIRCUIT AND COMMUNICATION DEVICE

(71) Applicant: MURATA MANUFACTURING CO., LTD., Kyoto (JP)

(72) Inventor: Atsushi Ono, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 2 days.

(21) Appl. No.: 16/830,902

(22) Filed: Mar. 26, 2020

(65) Prior Publication Data

US 2020/0313714 A1  Oct. 1, 2020

(30) Foreign Application Priority Data

Mar. 28, 2019  (JP) .............................. JP2019-063341

(51) Int. Cl.
| | |
|---|---|
| H04B 1/40 | (2015.01) |
| H04B 1/44 | (2006.01) |
| H04B 7/08 | (2006.01) |
| H04B 17/00 | (2015.01) |
| H04W 52/42 | (2009.01) |
| H04B 7/04 | (2017.01) |
| H04B 7/06 | (2006.01) |

(52) U.S. Cl.
CPC ..................................... H04B 1/40 (2013.01)

(58) Field of Classification Search
None
See application file for complete search history.

(56) References Cited

U.S. PATENT DOCUMENTS

| | | | | |
|---|---|---|---|---|
| 9,020,447 | B2 * | 4/2015 | Bengtsson | H04B 7/0874 455/78 |
| 10,673,514 | B1 * | 6/2020 | Klomsdorf | H04B 17/21 |
| 10,812,170 | B2 * | 10/2020 | Liu | H04B 7/0834 |
| 11,044,693 | B1 * | 6/2021 | Gummadi | G01S 5/0258 |
| 2007/0066244 | A1 * | 3/2007 | Kao | H04B 7/0808 455/78 |
| 2011/0249765 | A1 * | 10/2011 | Han | H04B 7/0814 375/267 |
| 2011/0250926 | A1 | 10/2011 | Wietfeldt et al. | |
| 2013/0308476 | A1 * | 11/2013 | He | H04B 7/0602 370/252 |

(Continued)

FOREIGN PATENT DOCUMENTS

JP  2016-007009 A  1/2016

*Primary Examiner* — Pablo N Tran
(74) *Attorney, Agent, or Firm* — Pearne & Gordon LLP

(57) ABSTRACT

Radio-frequency front-end circuit includes: first transfer circuit that transfers a 4G signal, a first antenna terminal connected to a first antenna, a second antenna terminal connected to a second antenna, and a switch that includes a first selection terminal and a second selection terminal. The first selection terminal is connected to the first transfer circuit, and the second selection terminal is connected to a second transfer circuit that transfers a 5G signal. The switch: when the first antenna is high in antenna sensitivity, connects the first antenna terminal to the first selection terminal, and connects the second antenna terminal to the second selection terminal; and when the second antenna is high in antenna sensitivity, connects the first antenna terminal to the second selection terminal, and connects the second antenna terminal to the first selection terminal.

20 Claims, 7 Drawing Sheets

(56) References Cited

U.S. PATENT DOCUMENTS

| | | |
|---|---|---|
| 2014/0273882 A1 | 9/2014 | Asrani et al. |
| 2016/0127015 A1 | 5/2016 | Wloczysiak et al. |
| 2019/0288825 A1* | 9/2019 | Kang .................... H04L 5/1461 |
| 2020/0186185 A1* | 6/2020 | Sakurai .................... H04B 1/48 |

* cited by examiner

RADIO-FREQUENCY FRONT-END CIRCUIT AND COMMUNICATION DEVICE

CROSS REFERENCE TO RELATED APPLICATION

The present application is based on and claims priority of Japanese Patent Application No. 2019-063341 filed on Mar. 28, 2019. The entire disclosure of the above-identified application, including the specification, drawings and claims is incorporated herein by reference in its entirety.

FIELD

The present disclosure relates to a radio-frequency front-end circuit and a communication device that includes the radio-frequency front-end circuit.

BACKGROUND

Radio-frequency front-end circuits that support multiband and multimode communication are required to simultaneously transfer a plurality of radio-frequency signals with low loss.

Patent Literature (PTL) 1 discloses a receiving module having a configuration in which a plurality of filters with different passbands are connected to an antenna via a multiplexer.

CITATION LIST

Patent Literature

PTL 1: U.S. Unexamined Patent Application Publication No. 2016/0127015

SUMMARY

Technical Problem

With the receiving module described in PTL 1, it is possible to simultaneously transfer radio-frequency signals of a plurality of communication bands in a single communication system. In recent years, however, there is a demand that radio-frequency signals be simultaneously transferred in a plurality of different communication systems. In a system in which radio-frequency signals of a plurality of different communication systems are simultaneously transferred, it is desired, in some cases, that one or some of the different communication systems be prioritized in transferring radio-frequency signals, in terms of improving connectivity of a communication line between a communications partner such as a base station and a terminal including a receiving module such as the one described in PTL 1.

However, with the receiving module described in PTL 1, it is not possible to preferentially select (optimize) a predetermined communication system among a plurality of communication systems.

In view of the above-described circumstances, the present disclosure is to provide a radio-frequency front-end module and a communication device which, when radio-frequency signals of a plurality of communication systems are simultaneously transferred, dynamically optimize signal transferring according to priorities of the communication systems.

Solution to Problem

A radio-frequency front-end circuit according to one aspect of the present disclosure is a radio-frequency front-end circuit for simultaneously transferring a first radio-frequency signal of a first communication system and a second radio-frequency signal of a second communication system different from the first communication system. The radio-frequency front-end circuit includes: a first transfer circuit that transfers the first radio-frequency signal; and a first switch that includes a first antenna terminal connected to a first antenna, a second antenna terminal connected to a second antenna that is different from the first antenna, and at least two selection terminals. In the radio-frequency front-end circuit, the at least two selection terminals of the first switch include a first selection terminal connected to the first transfer circuit, and a second selection terminal connected to a second transfer circuit that transfers the second radio-frequency signal, and the first switch: when the first antenna is higher in antenna sensitivity than the second antenna, connects the first antenna terminal to the first selection terminal, and connects the second antenna terminal to the second selection terminal; and when the second antenna is higher in antenna sensitivity than the first antenna, connects the first antenna terminal to the second selection terminal, and connects the second antenna terminal to the first selection terminal.

Advantageous Effects

According to the present disclosure, it is possible to provide a radio-frequency front-end circuit and a communication device which, when simultaneously transferring radio-frequency signals of a plurality of communication systems, dynamically optimize signal transferring according to priorities of the communication systems.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT

Figure 1A:
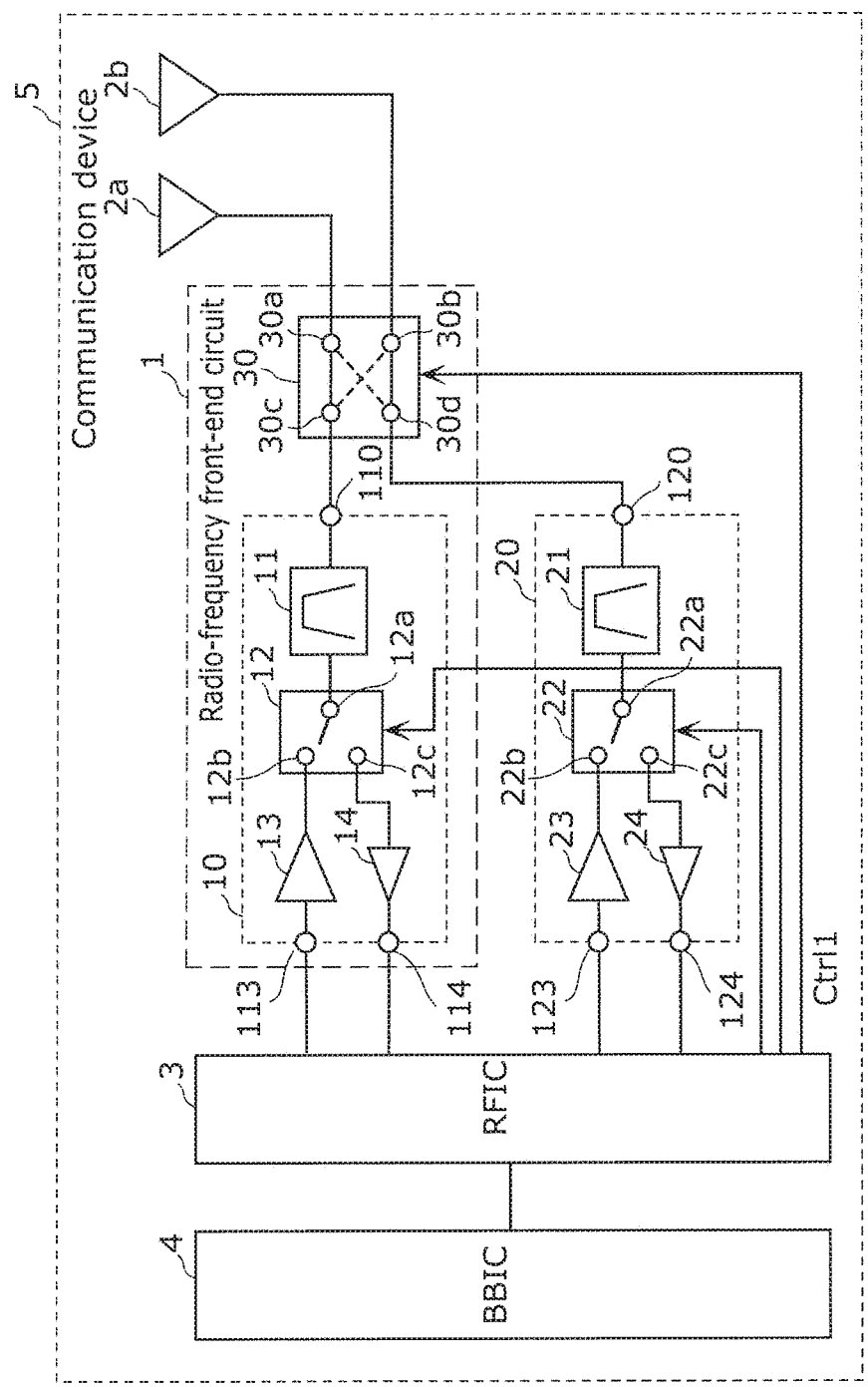
FIG. 1A is a diagram illustrating a circuit configuration of a radio-frequency front-end circuit and a communication device according to an embodiment.

The following describes in detail an embodiment of the present disclosure with reference to working examples and drawings. It should be noted that each of the embodiment and variations described below shows a general or specific example. The numerical values, shapes, materials, structural components, the arrangement and connection of the structural components, and so on, shown in the following embodiment and variations are mere examples, and therefore do not limit the present disclosure. Among the structural components in the following embodiment and variations, components not recited in the independent claims are described as arbitrary structural components. In addition, the sizes of structural components and the ratios of the sizes in the drawings are not necessarily strictly illustrated.

Embodiment

[1. Configurations of Radio-Frequency Font-End Circuit 1 and Communication Device 5]

FIG. 1A is a diagram illustrating a circuit configuration of radio-frequency front-end circuit 1 and communication device 5 according to an embodiment. As illustrated in FIG. 1A, communication device 5 includes radio-frequency front-end circuit 1, transfer circuit 20, antenna 2a and antenna 2b, RF signal processing circuit (RFIC) 3, and baseband signal processing circuit (BBIC) 4.

Radio-frequency front-end circuit 1 includes transfer circuit 10 and switch 30.

Transfer circuit 10 is one example of a first transfer circuit, and transfers a first radio-frequency signal of a first communication system. Transfer circuit 10 includes transmission and reception terminal 110, transmission input terminal 113, reception output terminal 114, filter 11, switch 12, power amplifier 13, and low-noise amplifier 14.

Filter 11 is a bandpass filter which has as a passband, for example, a first communication band of the first communication system, and is connected between transmission and reception terminal 110 and common terminal 12a.

Power amplifier 13 is one example of a first power amplifier, and amplifies a first radio-frequency signal that has been input to transmission input terminal 113. Power amplifier 13 is connected between transmission input terminal 113 and selection terminal 12b.

Low-noise amplifier 14 is one example of a first low-noise amplifier, and amplifies the first radio-frequency signal that has been input to transmission and reception terminal 110. Low-noise amplifier 14 is connected between selection terminal 12c and reception output terminal 114.

Power amplifier 13 and low-noise amplifier 14 include, for example, a Si complementary metal oxide semiconductor (CMOS) or a field-effect transistor (FET), a hetero bipolar transistor (HBT), etc., which include GaAs as a material.

Switch 12 is one example of a transmission and reception selector switch, and is a switching circuit which includes common terminal 12a and selection terminals 12b and 12c, and exclusively switches between connecting common terminal 12a to selection terminal 12b and connecting common terminal 12a to selection terminal 12c.

With the above-described configuration, when common terminal 12a and selection terminal 12b are connected, transfer circuit 10 outputs the first radio-frequency signal amplified by power amplifier 13 toward antennas 2a and 2b via switch 12 and filter 11. In contrast, when common terminal 12a and selection terminal 12c are connected, transfer circuit 10 amplifies, by low-noise amplifier 14, the first radio-frequency signal that has been received by antennas 2a or 2b and has passed through filter 11 and switch 12, and outputs the amplified first radio-frequency signal toward RFIC 3. More specifically, transfer circuit 10 executes transmission and reception of the first radio-frequency signals in a time division duplex (TDD) system, through the switching operation performed by switch 12.

It should be noted that transfer circuit 10 may execute transmission and reception of the first radio-frequency signals in a frequency division duplex (FDD) system. In this case, a duplexer which includes a transmission filter and a reception filter is disposed instead of filter 11 and switch 12.

Transfer circuit 20 is one example of a second transfer circuit, and transfers a second radio-frequency signal of a second communication system that is a system different from the first communication system. Transfer circuit 20 includes transmission and reception terminal 120, transmission input terminal 123, reception output terminal 124, filter 21, switch 22, power amplifier 23, and low-noise amplifier 24.

Filter 21 is a bandpass filter which has as a passband, for example, a second communication band of the second communication system, and is connected between transmission and reception terminal 120 and common terminal 22a.

Power amplifier 23 is one example of a second power amplifier, and amplifies a second radio-frequency signal that has been input to transmission input terminal 123. Power amplifier 23 is connected between transmission input terminal 123 and selection terminal 22b.

Low-noise amplifier 24 is one example of a second low-noise amplifier, and amplifies the second radio-frequency signal that has been input to transmission and reception terminal 120. Low-noise amplifier 24 is connected between selection terminal 22c and reception output terminal 124.

Power amplifier 23 and low-noise amplifier 24 include, for example, an Si CMOS or a field-effect transistor (FET), a hetero bipolar transistor (HBT), etc. which include GaAs as a material.

Switch 22 is one example of a transmission and reception selector switch, and is a switching circuit which includes common terminal 22a and selection terminals 22b and 22c, and exclusively switches between connecting common terminal 22a to selection terminal 22b and connecting common terminal 22a to selection terminal 22c.

With the above-described configuration, when common terminal 22a and selection terminal 22b are connected, transfer circuit 20 outputs the second radio-frequency signal amplified by power amplifier 23 toward antennas 2a and 2b via switch 22 and filter 21. In contrast, when common terminal 22a and selection terminal 22c are connected, transfer circuit 20 amplifies, by low-noise amplifier 24, the second radio-frequency signal that has been received by antennas 2a or 2b and has passed through filter 21 and switch 22, and outputs the amplified second radio-frequency signal toward RFIC 3. More specifically, transfer circuit 20 executes transmission and reception of the second radio-frequency signal in a time division duplex (TDD) system, through the switching operation performed by switch 22.

It should be noted that transfer circuit 20 may execute transmission and reception of the second radio-frequency signals in a frequency division duplex (FDD) system. In this case, a duplexer which includes a transmission filter and a reception filter is disposed, instead of filter 21 and switch 22.

In radio-frequency front-end circuit 1 and communication device 5 according to the embodiment, the second radio-frequency signal of the second communication system includes user data of the second communication system. In addition, the first radio-frequency signal of the first communication system includes communication control data for enabling user data of the second communication system to be transferred by transfer circuit 20 and user data of the first communication system.

Switch 30 is one example of a first switch, and includes antenna terminals 30a (a first antenna terminal) and 30b (a second antenna terminal), and selection terminals 30c (a first selection terminal) and 30d (a second selection terminal). Antenna terminal 30a is connected to antenna 2a, and antenna terminal 30b is connected to antenna 2b. In addition, selection terminal 30c is connected to transfer circuit 10, and selection terminal 30d is connected to transfer circuit 20. It should be noted that, although two selection terminals, namely, selection terminals 30c and 30d, have been exemplified above, the total number of the selection terminals is not limited to two, and may be three or more.

In switch 30, selection between conduction of antenna terminal 30a with selection terminal 30c and conduction of antenna terminal 30a with selection terminal 30d is exclusively carried out, and selection between conduction of antenna terminal 30b with selection terminal 30c and conduction of antenna terminal 30b with selection terminal 30d is exclusively carried out.

Switch 30 is, for example, a switching circuit of the double pole double throw (DPDT) type, and includes antenna terminals 30a and 30b and selection terminals 30c and 30d. It should be noted that switch 30 may be a switching circuit such as DP3T and DP4T. In this case, terminals according to the number of transfer circuits to be connected are used. Radio-frequency front-end circuit 1 may further include transfer circuit 20 in addition to transfer circuit 10 and switch 30. When radio-frequency front-end circuit 1 includes both transfer circuits 10 and 20, transfer circuits 10 and 20 may be mounted on a single mounting board or in a single package.

The above-described configurations of radio-frequency front-end circuit 1 and transfer circuit 20 enable the first radio-frequency signal of the first communication system and the second radio-frequency signal of the second communication system to be simultaneously transferred. More specifically, for example, common terminal 12a and selection terminal 12b of switch 12 are connected, common terminal 22a and selection terminal 22b of switch 22 are connected, antenna terminal 30a and selection terminal 30c of switch 30 are connected, and antenna terminal 30b and selection terminal 30d of switch 30 are connected, thereby enabling the first radio-frequency signal of the first communication system and the second radio-frequency signal of the second communication system to be in a state of transmission at a same point in time. In addition, for example, common terminal 12a and selection terminal 12c of switch 12 are connected, common terminal 22a and selection terminal 22c of switch 22 are connected, antenna terminal 30a and selection terminal 30c of switch 30 are connected, and antenna terminal 30b and selection terminal 30d of switch 30 are connected, thereby enabling the first radio-frequency signal of the first communication system and the second radio-frequency signal of the second communication system to be in a state of reception at a same point in time.

It should be noted that transfer circuits 10 and 20 may each be a circuit capable of either transmitting or receiving a radio-frequency signal.

When transfer circuit 10 performs only transmission of the first radio-frequency signal, it is sufficient if transfer circuit 10 includes at least power amplifier 13. When transfer circuit 20 performs only transmission of the second radio-frequency signal, it is sufficient if transfer circuit 20 includes at least power amplifier 23. With the above-described configurations of transfer circuits 10 and 20, it is possible to enable the first radio-frequency signal of the first communication system and the second radio-frequency signal of the second communication system to be in a state of transmission at a same point in time.

On the other hand, when transfer circuit 10 performs only reception of the first radio-frequency signal, it is sufficient if transfer circuit 10 includes at least low-noise amplifier 14. When transfer circuit 20 performs only reception of the second radio-frequency signal, it is sufficient if transfer circuit 20 includes at least low-noise amplifier 24. With the above-described configurations of transfer circuits 10 and 20, it is possible to enable the first radio-frequency signal of the first communication system and the second radio-frequency signal of the second communication system to be in a state of reception at a same point in time.

Antenna 2a is one example of the first antenna. Antenna 2a is connected to antenna terminal 30a of switch 30, and emits or receives the first radio-frequency signal and the second radio-frequency signal. Antenna 2b is one example of the second antenna.

Antenna 2b is connected to antenna terminal 30b of switch 30, and emits or receives the first radio-frequency signal and the second radio-frequency signal.

RFIC 3 is an RF signal processing circuit that processes the first radio-frequency signal and the second radio-frequency signal. More specifically, RFIC 3 performs signal processing, by up-conversion, etc., on a signal to be transmitted that has been input from BBIC 4, and outputs, to transfer circuits 10 and 20, a radio-frequency signal to be transmitted that has been generated by the signal processing. In addition, RFIC 3 includes a controller that outputs, to switch 30, control signal Ctrl1 for switching the connected state of switch 30, based on superiority or inferiority of antenna sensitivities of antennas 2a and 2b. Moreover, the above-described controller may output, to switch 12, a control signal for switching between a transmission mode and a reception mode of transfer circuit 10, and output, to switch 22, a control signal for switching between a transmission mode and a reception mode of transfer circuit 20.

BBIC 4 is a circuit that performs signal processing using an intermediate frequency band having a lower frequency than a frequency band of the radio-frequency signal that is transferred through transfer circuits 10 and 20. The signal processed by BBIC 4 is, for example, used as an image signal for image display or as a sound signal for telephone conversation via a speaker.

RFIC 3 and BBIC 4 are each a signal processing circuit that processes a radio-frequency signal. The above-described controller may be included in BBIC 4.

With the above-described configuration, switch 30 switches connections between transfer circuits 10 and 20 and antennas 2a and 2b according to superiority or inferiority of antenna sensitivities of antennas 2a and 2b.

Figure 1B:
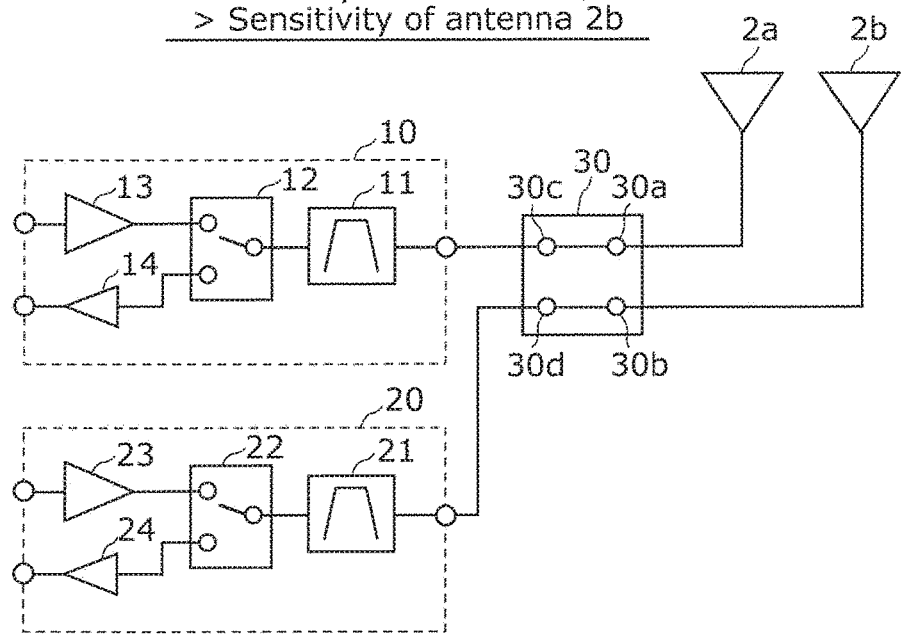
FIG. 1B is a circuit diagram illustrating a first connected state of antennas and transfer circuits in the communication device according to the embodiment.
Figure 1C:
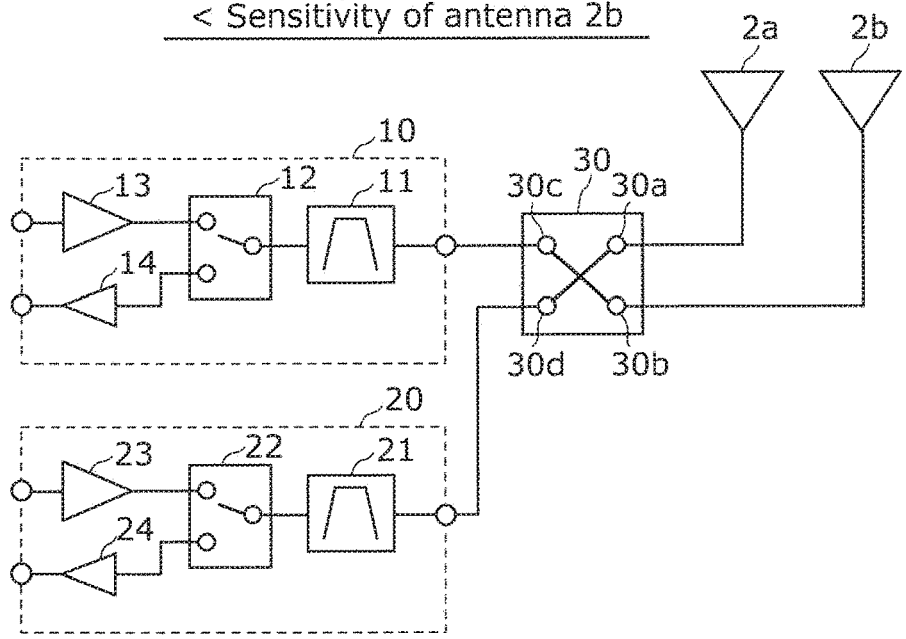
FIG. 1C is a circuit diagram illustrating a second connected state of antennas and transfer circuits in the communication device according to the embodiment.

FIG. 1B is a circuit diagram illustrating a first connected state of antennas 2a and 2b and transfer circuits 10 and 20 in communication device 5 according to the embodiment. FIG. 1C is a circuit diagram illustrating a second connected state of antennas 2a and 2b and transfer circuits 10 and 20 in communication device 5 according to the embodiment.

As illustrated in FIG. 1B, when antenna 2a is higher in antenna sensitivity than antenna 2b, switch 30 connects antenna terminal 30a to selection terminal 30c to which transfer circuit 10 is connected, and connects antenna terminal 30b to selection terminal 30d to which transfer circuit 20 is connected. As illustrated in FIG. 1C, when antenna 2b is higher in antenna sensitivity than antenna 2a, switch 30 connects antenna terminal 30a to selection terminal 30d to which transfer circuit 20 is connected, and connects antenna terminal 30b to selection terminal 30c to which transfer circuit 10 is connected.

According to the above-described configuration, transfer circuit 10 is in a state of being connected to an antenna having a high antenna sensitivity while at the same time transfer circuit 20 is in a state of being connected to an antenna having low antenna sensitivity, and thus connection reliability of the first communication system that is to be used for a priority connection is improved. In other words, when simultaneously communicating radio-frequency signals of mutually different communication systems such as the first communication system and the second communication system, it is possible to dynamically optimize connection between transfer circuits 10 and 20 and antennas 2a and 2b according to priority of signal transferring.

It should be noted that, in radio-frequency front-end circuit 1 and communication device 5 according to the embodiment, the second radio-frequency signal of the second communication system may include a signal indicating user data of the second communication system, and the first radio-frequency signal of the first communication system may include a signal indicating communication control data for enabling the user data of the second communication system to be transferred via transfer circuit 20. The first radio-frequency signal of the first communication system may include a signal indicating user data of the first communication system in addition to the above-described communication control data.

Some applications may require simultaneously performing data communication of the first communication system and data communication of the second communication system between a base station (communications partner) and a mobile terminal including communication device 5 (radio-frequency front-end circuit 1). In performing this, when communication control data for enabling the user data of the second communication system to be transferred via transfer circuit 20 is included in the first radio-frequency signal of the first communication system, connectivity between the communications partner and the mobile terminal is improved by placing a priority on wireless connection between the communications partner and transfer circuit 10 over wireless connection between the communications partner and transfer circuit 20.

According to the above-described configuration, transfer circuit 10 is connected to an antenna having a high antenna sensitivity and transfer circuit 20 is connected to an antenna having a low antenna sensitivity, and thus connection reliability of the first communication system that is to be used for the priority connection is improved. In other words, when simultaneously communicating radio-frequency signals of mutually different communication systems such as the first communication system and the second communication system, it is possible to dynamically optimize connection between transfer circuits 10 and 20 and antennas 2a and 2b according to priority of signal transferring. Accordingly, connectivity of a communication line between a communications partner such as a base station and a mobile terminal including radio-frequency front-end circuit 1 (communication device 5) is improved.

[2. Configurations of Radio-Frequency Font-End Circuit 1A and Communication Device 5A According to a Working Example]

Figure 2:
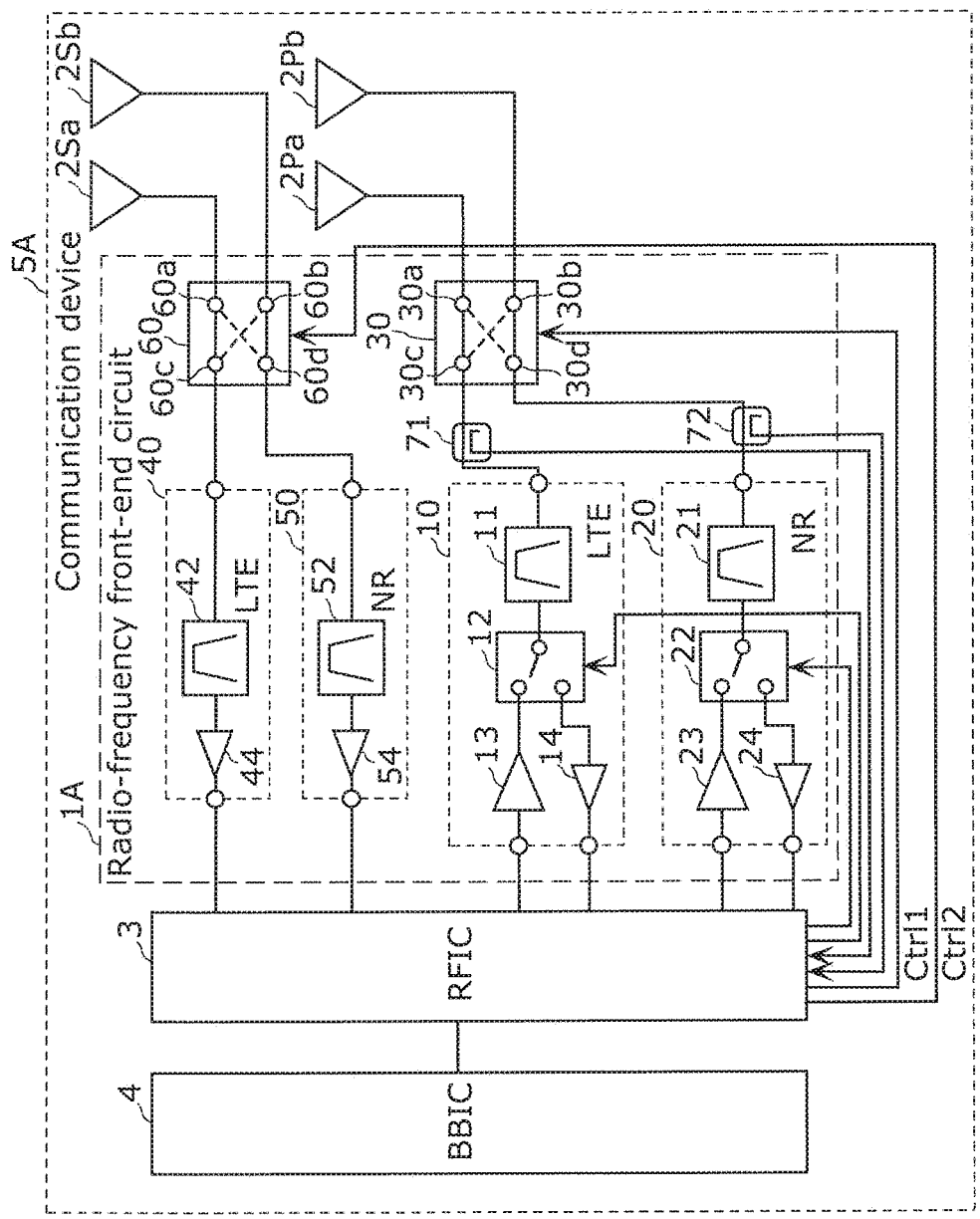
FIG. 2 is a diagram illustrating a circuit configuration of a radio-frequency front-end circuit and a communication device according to a working example.

FIG. 2 is a diagram illustrating a circuit configuration of radio-frequency font-end circuit 1A and communication device 5A according to a working example. Radio-frequency front-end circuit 1A and communication device 5A are one working examples of radio-frequency front-end circuit 1 and communication device 5 of the embodiment, respectively, in which the fourth generation communication system (4G) is applied as the first communication system, and the fifth generation communication system (5G) is applied as the second communication system. In the following, description of the configurations of radio-frequency front-end circuit 1A and communication device 5A according to the working example that are the same as the configurations of radio-frequency front-end circuit 1 and communication device 5 according to the embodiment will be omitted, and description will be centered on a different configuration.

As illustrated in FIG. 2, communication device 5A includes radio-frequency front-end circuit 1A, antennas 2Pa, 2Pb, 2Sa, and 2Sb, RFIC 3, and BBIC 4.

Radio-frequency front-end circuit 1A includes transfer circuits 10 and 20, reception circuits 40 and 50, switches 30 and 60, and couplers 71 and 72.

Transfer circuit 10 is one example of a first transfer circuit, and transfers a first radio-frequency signal of the first communication system. In the working example, the first communication system is the 4G, and the first radio-frequency signal is a signal of a long term evolution (LTE) communication band.

Transfer circuit 20 is one example of a second transfer circuit, and transfers a second radio-frequency signal of the second communication system. In the working example, the second communication system is the 5G, and the second radio-frequency signal is a signal of a new radio (NR) communication band.

Here, transfer circuit 10 transfers, for example, a first radio-frequency signal of 4G (LTE) Band 41 (transmission and reception band: 2496 MHz to 2690 MHz, the first communication band). In this case, filter 11 is a filter having, as a passband, a transmission and reception band of the 4G (LTE) Band 41. Transfer circuit 20 transfers, for example, a second radio-frequency signal of 5G (NR) n 41 (transmission and reception band: 2496 MHz to 2690 MHz, the second communication band). In this case, filter 21 is a filter having, as a passband, a transmission and reception band of the 5G (NR) n 41.

More specifically, transfer circuit 10 transfers radio-frequency signals of the first communication band stipulated in 4G, and transfer circuit 20 transfers radio-frequency signals of the second communication band that is stipulated in 5G and has a frequency range same as a frequency range of the first communication band. According to this configuration, even when the frequency bands of radio-frequency signals transferred by transfer circuits 10 and 20 at least partially overlap, transfer circuits 10 and 20 are respectively connected to antennas 2Pa and 2Pb which are different from each other, and thus it is possible to simultaneously transfer the radio-frequency signal of transfer circuit 10 and the radio-frequency signal of transfer circuit 20. It should be noted that the communication band for transferring via transfer circuit 10 may be different from the communication band for transferring via transfer circuit 20.

Switch 30 is one example of the first switch, and includes antenna terminals 30a (the first antenna terminal) and 30b (the second antenna terminal), and selection terminals 30c (the first selection terminal) and 30d (the second selection terminal). Antenna terminal 30a is connected to antenna 2Pa, and antenna terminal 30b is connected to antenna 2Pb. In addition, selection terminal 30c is connected to transmission circuit 10, and selection terminal 30d is connected to transmission circuit 20. It should be noted that, although two selection terminals, namely, selection terminals 30c and 30d, have been exemplified above, the total number of selection terminals is not limited to two, and may be three or more.

Reception circuit 40 is one example of the first reception circuit, and transfers a first reception signal of the first communication system. Reception circuit 40 includes an input terminal, an output terminal, filter 42, and low-noise amplifier 44.

Filter 42 is a bandpass filter which has as a passband, for example, a 4G (LTE) first communication band, and is connected between the input terminal and low-noise amplifier 44.

Low-noise amplifier 44 preferentially amplifies, for example, a first reception signal of the 4G (LTE) first communication band. Low-noise amplifier 44 is connected between filter 42 and the output terminal.

Reception circuit 50 is one example of the second reception circuit, and transfers a second reception signal of the second communication system. Reception circuit 50 includes an input terminal, an output terminal, filter 52, and low-noise amplifier 54.

Filter 52 is a bandpass filter which has as a passband, for example, a 5G (NR) second communication band, and is connected between the input terminal and low-noise amplifier 54.

Low-noise amplifier 54 preferentially amplifies, for example, a second reception signal of the 5G (NR) second communication band. Low-noise amplifier 54 is connected between filter 52 and the output terminal.

Reception circuits 40 and 50 serve as, for example, diversity circuits, and reception circuit 40 receives, for example, a first reception signal of 4G (LTE) Band 41. In this case, filter 42 is a filter having, as a passband, a transmission and reception band of 4G (LTE) Band 41. In addition, reception circuit 50 receives, for example, a second reception signal of 5G (NR) n 41. In this case, filter 52 is a filter having, as a passband, a transmission and reception band of 5G (NR) n 41.

Switch 60 is one example of the second switch, and includes antenna terminals 60a (the third antenna terminal) and 60b (the fourth antenna terminal), and selection terminals 60c (the third selection terminal) and 60d (the fourth selection terminal). Antenna terminal 60a is connected to antenna 2Sa, and antenna terminal 60b is connected to antenna 2Sb. In addition, selection terminal 60c is connected to reception circuit 40, and selection terminal 60d is connected to reception circuit 50. It should be noted that, although two selection terminals, namely, selection terminals 60c and 60d, have been exemplified above, the total number of selection terminals is not limited to two, and may be three or more.

Switch 60 is, for example, a DPDT switching circuit, and includes antenna terminals 60a and 60b and selection terminals 60c and 60d. It should be noted that switch 60 may be a DP3T switching circuit or a DP4T switching circuit. In this case, terminals according to the total number of transmission circuits to be connected are used.

Antenna 2Pa is one example of a first antenna and connected to antenna terminal 30a of switch 30, and antenna 2Pb is one example of a second antenna and connected to antenna terminal 30b of switch 30. Antennas 2Pa and 2Pb emit or receive 4G or 5G radio-frequency signals.

Antenna 2Sa is one example of a third antenna and connected to antenna terminal 60a of switch 60, and antenna 2Sb is one example of a fourth antenna and connected to antenna terminal 60b of switch 60. Antennas 2Sa and 2Sb receive 4G or 5G radio-frequency signals.

It should be noted that antennas 2Pa and 2Pb are primary antennas which are used in preference to antennas 2Sa and 2Sb in view of an antenna performance, etc. In contrast, antennas 2Sa and 2Sb are secondary antennas for receiving only.

Coupler 71 is disposed in a path connecting transfer circuit 10 and selection terminal 30c of switch 30, and measures a transmission power value of the first radio-frequency signal that has been output from transfer circuit 10. The transmission power value of the first radio-frequency signal that has been measured is transferred to a controller of RFIC 3. It should be noted that when selection terminal 30c and antenna terminal 30a are connected, the greater the transmission power value measured by coupler 71 is, the lower the antenna sensitivity of antenna 2Pa for the first radio-frequency signal is, and the smaller the transmission power value measured by coupler 71 is, the higher the antenna sensitivity of antenna 2Pa for the first radio-frequency signal is. In addition, when selection terminal 30c and antenna terminal 30b are connected, the greater the transmission power value measured by coupler 71 is, the lower the antenna sensitivity of antenna 2Pb for the first radio-frequency signal is, and the smaller the transmission power value measured by coupler 71 is, the higher the antenna sensitivity of antenna 2Pb for the first radio-frequency signal is.

It should be noted that coupler 71 may be disposed in the path connecting antenna terminal 30a of switch 30 and antenna 2Pa. In this case, coupler 71 measures a transmission power value of the first radio-frequency signal output from transfer circuit 10 or a transmission power value of the second radio-frequency signal output from transfer circuit 20, according to the connected state of switch 30.

Coupler 72 is disposed in a path connecting transfer circuit 20 and selection terminal 30d of switch 30, and measures a transmission power value of the second radio-frequency signal that has been output from transfer circuit 20. The transmission power value of the second radio-frequency signal that has been measured is transferred to a controller of RFIC 3. It should be noted that when selection terminal 30d and antenna terminal 30b are connected, the greater the transmission power value measured by coupler 72 is, the lower the antenna sensitivity of antenna 2Pb for the second radio-frequency signal is, and the smaller the transmission power value measured by coupler 72 is, the higher the antenna sensitivity of antenna 2Pb for the second radio-frequency signal is. In addition, when selection terminal 30d and antenna terminal 30a are connected, the greater the transmission power value measured by coupler 72 is, the lower the antenna sensitivity of antenna 2Pa for the second radio-frequency signal is, and the smaller the transmission power value measured by coupler 72 is, the higher the antenna sensitivity of antenna 2Pa for the second radio-frequency signal is.

It should be noted that coupler 72 may be disposed in the path connecting antenna terminal 30b of switch 30 and antenna 2Pb. In this case, coupler 72 measures a transmission power value of the first radio-frequency signal output from transfer circuit 10 or a transmission power value of the second radio-frequency signal output from transfer circuit 20, according to the connected state of switch 30.

In the above-described configuration, switch 30 switches connections between transfer circuits 10 and 20 and antennas 2Pa and 2Pb according to superiority or inferiority of antenna sensitivities of antennas 2Pa and 2Pb. When antenna 2Pa is higher in antenna sensitivity than antenna 2Pb, switch 30 connects antenna terminal 30a to selection terminal 30c, and connects antenna terminal 30b to selection terminal 30d. When antenna 2Pb is higher in antenna sensitivity than antenna 2Pa, switch 30 connects selection terminal 30d to antenna terminal 30a, and connects selection terminal 30c to antenna terminal 30b.

More specifically, when it is determined that antenna 2Pa is higher in antenna sensitivity than antenna 2Pb on the basis of a transmission power value of the first radio-frequency signal and a transmission power value of the second radio-frequency signal which have been transferred from couplers 71 and 72, the controller of RFIC 3 outputs, to switch 30, control signal Ctrl1 for implementing the following connected state. In this case, control signal Ctrl1 is a signal for connecting antenna terminal 30a to selection terminal 30c, and connecting antenna terminal 30b to selection terminal 30d. In addition, when it is determined that antenna 2Pb is higher in antenna sensitivity than antenna 2Pa on the basis of a transmission power value of the first radio-frequency signal and a transmission power value of the second radio-frequency signal which have been transferred from couplers 71 and 72, the controller of RFIC 3 outputs, to switch 30, control signal Ctrl1 for implementing the following connected state. In this case, control signal Ctrl1 is a signal for connecting antenna terminal 30a to selection terminal 30d, and connecting antenna terminal 30b to selection terminal 30c.

Figure 3:
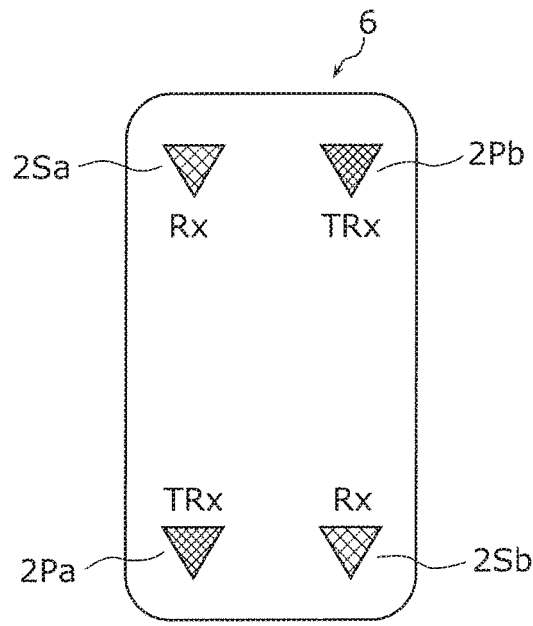
FIG. 3 is a schematic view illustrating an arrangement configuration of antennas in a mobile phone.
Figure 4:
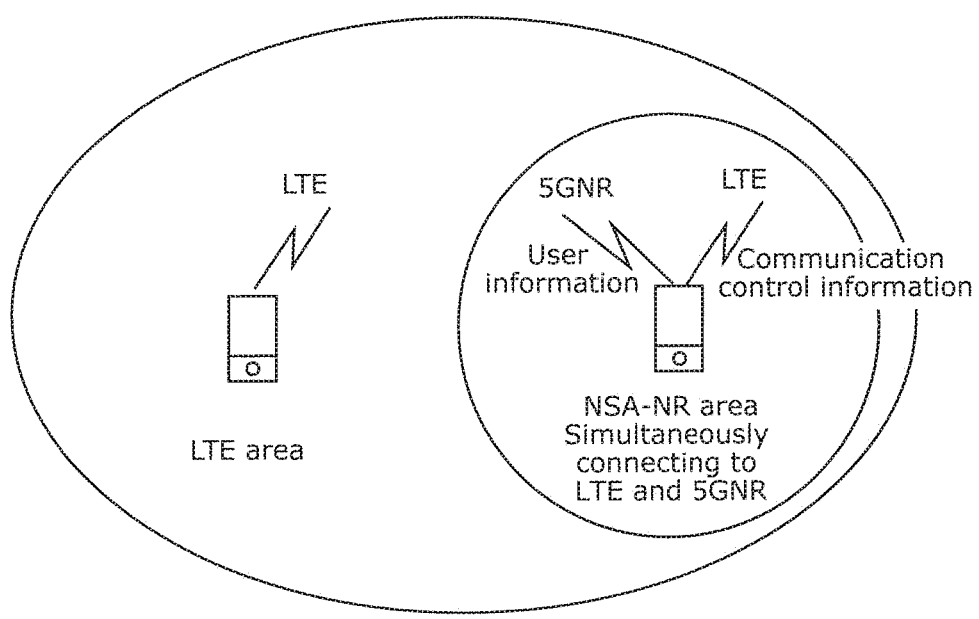
FIG. 4 is a conceptual diagram illustrating a relationship between an LTE area and an NSA-NR area in a mobile communication network.

FIG. 3 is a schematic view illustrating an arrangement configuration of antennas in mobile phone 6. FIG. 4 is a conceptual diagram illustrating a relationship between an LTE area and a Non-Standalone-New Radio (NSA-NR) area in a mobile communication network.

NSA-NR is a communication architecture that is in the process of being introduced in recent years. As illustrated in FIG. 4, NSA-NR is a technique with which a 5G (NR) communication area is established in a 4G (LTE) communication area, and communications of both sides of 5G (NR) and 4G (LTE) are controlled by a control channel of the 4G side. NSA is stipulated in, for example, TR38.801 that is a technical report on the network architecture.

Accordingly, NSA-NR, relies on simultaneously connecting the 4G transfer circuit and the 5G transfer circuit to the communication line, with 4G (LTE) being the master and 5G (NR) being the slave (LTE-NR dual connectivity: EN-DC). In order to implement this, with communication device 5A according to the working example, transfer circuit 10 for 4G (LTE) is connected to one of two antennas 2Pa and 2Pb, and transfer circuit 20 for 5G (NR) is connected to the other of the two antennas.

As illustrated in FIG. 3, four antennas 2Pa, 2Pb, 2Sa, and 2Sb, for example, are arranged respectively at four corners of mobile phone 6 in consideration of mutual interference. However, the above-described four antennas change in characteristics according to the location environment (e.g., hand contact or proximity of a metal body) of mobile phone 6. For that reason, when the antenna sensitivity of an antenna connected to transfer circuit 10 that transfers a 4G (LTE) radio-frequency signal including 5G (NR) communication control data deteriorates, communication connectivity of not only transfer circuit 10 for 4G (LTE) but also transfer circuit 20 for 5G (NR) deteriorates.

In contrast, with the above-described configurations of radio-frequency front-end circuit 1A and communication device 5A according to the working example, transfer circuit 10 for 4G (LTE) is connect to an antenna which is high in antenna sensitivity and transfer circuit 20 for 5G (NR) is connected to an antenna which is low in antenna sensitivity. Accordingly, connection reliability of the 4G (LTE) that is to be used for the priority connection is improved. In other words, when simultaneously transferring radio-frequency signals of mutually different 4G (LTE) and 5G (NR), it is possible to dynamically optimize connection between transfer circuits and antennas according to the priority of signal transferring and the superiority or inferiority of antenna sensitivities. Accordingly, the connectivity of a communication line between a communications partner such as a base station and a mobile terminal including the above-described radio-frequency front-end circuit is improved.

It should be noted that, in radio-frequency front-end circuit 1A and communication device 5A according to the working example, when it is determined that antenna 2Pa is higher in antenna sensitivity than antenna 2Pb on the basis of a reception power value of the first radio-frequency signal and a reception power value of the second radio-frequency signal which have been obtained by a received signal strength indicator (RSSI) included in RFIC 3, the controller of RFIC 3 may output, to switch 30, control signal Ctrl1 for implementing the following connected state. In this case, control signal Ctrl1 is a signal for connecting antenna terminal 30a to selection terminal 30c, and connecting antenna terminal 30b to selection terminal 30d. In addition, when it is determined that antenna 2Pb is higher in antenna sensitivity than antenna 2Pa on the basis of a reception power value of the first radio-frequency signal and a reception power value of the second radio-frequency signal which have been obtained by the RSSI, the controller of RFIC 3 may output, to switch 30, control signal Ctrl1 for implementing the following connected state. In this case, control signal Ctrl1 is a signal for connecting antenna terminal 30a to selection terminal 30d, and connecting antenna terminal 30b to selection terminal 30c.

In addition, switching connections between transfer circuits 10 and 20 and antennas 2Pa and 2Pb which are primary antennas in radio-frequency front-end circuit 1A and communication device 5A according to the working example has been described. Instead of this, in radio-frequency front-end circuit 1A and communication device 5A according to the working example, connections between reception circuits 40 and 50 and antennas 2Sa and 2Sb which are secondary antennas may be switched according to superiority or inferiority in antenna sensitivity of antennas 2Sa and 2Sb.

More specifically, when antenna 2Sa is higher in antenna sensitivity than antenna 2Sb, switch 60 connects antenna terminal 60a to selection terminal 60c, and connects antenna terminal 60b to selection terminal 60d. In contrast, when antenna 2Sb is higher in antenna sensitivity than antenna 2Sa, switch 60 connects antenna terminal 60a to selection terminal 60d, and connects antenna terminal 60b to selection terminal 60c.

More specifically, when it is determined that antenna 2Sa is higher in antenna sensitivity than antenna 2Sb on the basis of a reception power value of the first reception signal and a reception power value of the second reception signal which have been obtained by the RSSI included in RFIC 3, the controller of RFIC 3 outputs, to switch 60, control signal Ctrl2 for implementing the following connected state. In this case, control signal Ctrl2 is a signal for connecting antenna terminal 60a to selection terminal 60c, and connecting antenna terminal 60b to selection terminal 60d. In contrast, when it is determined that antenna 2Sb is higher in antenna sensitivity than antenna 2Sa on the basis of a reception power value of the first reception signal and a reception power value of the second reception signal which have been obtained by the RSSI included in RFIC 3, the controller of RFIC 3 outputs, to switch 60, control signal Ctrl2 for implementing the following connected state. In this case, control signal Ctrl2 is a signal for connecting antenna terminal 60*a* to selection terminal 60*d*, and connecting antenna terminal 60*b* to selection terminal 60*c*.

In this manner, reception circuit 40 for 4G (LTE) is connected to the secondary antenna which is high in antenna sensitivity, and reception circuit 50 for 5G (NR) is connected to the secondary antenna which is low in antenna sensitivity, and thus the connection reliability of 4G (LTE) that is to be used for the priority connection is improved. In other words, when simultaneously receiving radio-frequency signals of mutually different 4G (LTE) and 5G (NR), it is possible to dynamically optimize connection between reception circuits and antennas according to the priority of signal reception and the superiority or inferiority of antenna sensitivities. Accordingly, the connectivity of a communication line between a communications partner such as a base station and a mobile terminal including the above-described radio-frequency front-end circuit is improved.

[3. Configurations of Radio-Frequency Font-End Circuit 1B and Communication Device 5B According to Variation 1]

Figure 5:
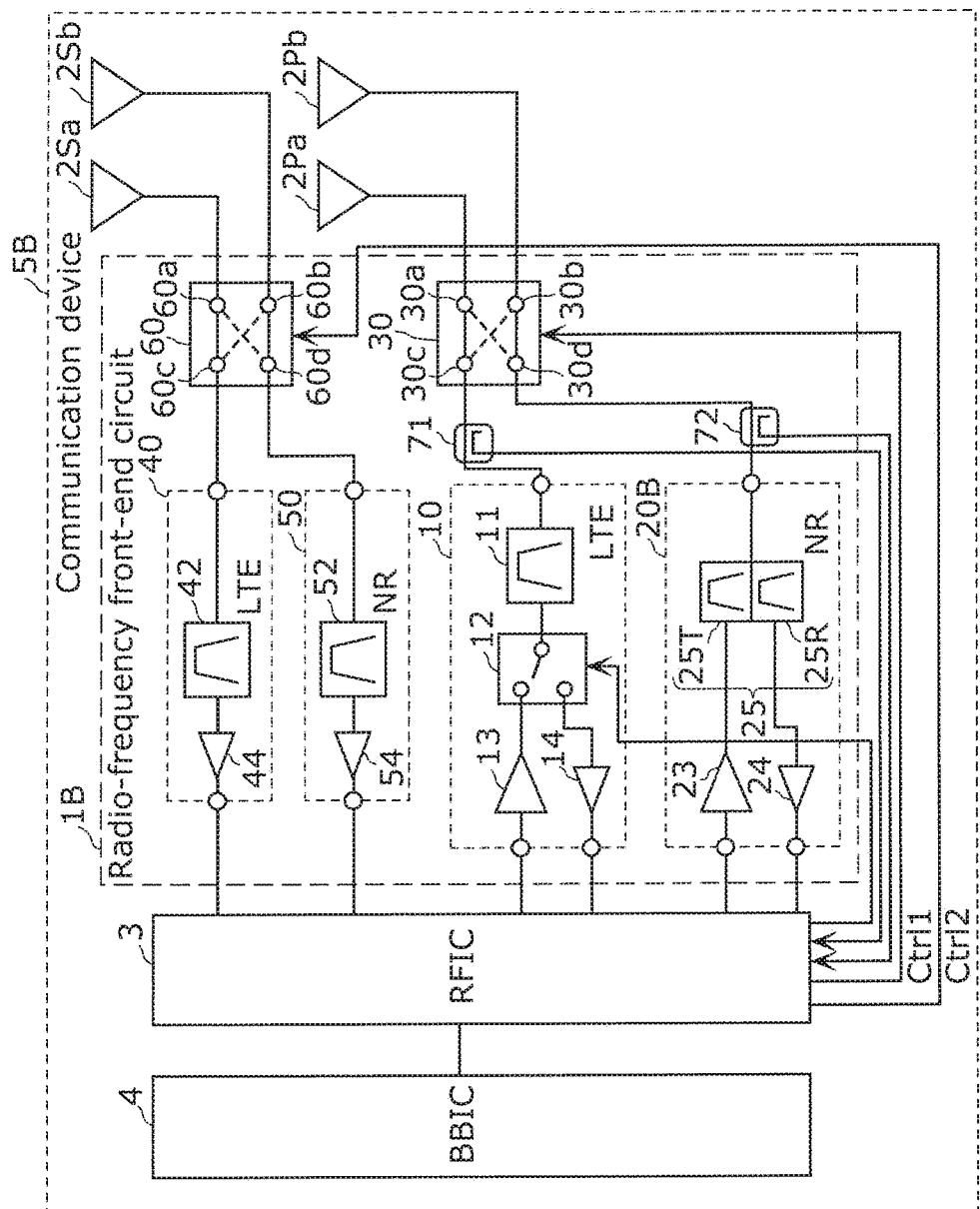
FIG. 5 is a diagram illustrating a circuit configuration of a radio-frequency front-end circuit and a communication device according to Variation 1.

FIG. 5 is a diagram illustrating a circuit configuration of radio-frequency font-end circuit 113 and communication device 5B according to Variation 1. Radio-frequency front-end circuit 13 and communication device 5B according to the present variation are one working examples of radio-frequency front-end circuit 1 and communication device 5 according to the embodiment. In radio-frequency front-end circuit 1B and communication device 5B, 4G is applied as the first communication system and 5G is applied as the second communication system. Radio-frequency front-end circuit 1B and communication device 5B according to the present variation are different in the configuration of the second transfer circuit from radio-frequency front-end circuit 1A and communication device 5A according to the working example. In the following, description of the configurations of radio-frequency front-end circuit 1B and communication device 5B according to the present variation that are the same as the configurations of radio-frequency front-end circuit 1A and communication device 5A according to the working example will be omitted, and description will be centered on a different configuration.

As illustrated in FIG. 5, communication device 5B includes radio-frequency front-end circuit 113, antennas 2Pa, 2Pb, 2Sa, and 2Sb, RFIC 3, and BBIC 4. Radio-frequency front-end circuit 1B includes transfer circuits 10 and 20B, reception circuits 40 and 50, switches 30 and 60, and couplers 71 and 72.

Transfer circuit 10 is one example of the first transfer circuit, and transfers a first radio-frequency signal of the first communication system. In the present variation, the first communication system is the 4G, and the first radio-frequency signal is a signal of an LTE communication band.

Filter 11 is a bandpass filter which has, as a passband, a first communication band of the first communication system, and is connected between a transmission and reception terminal and switch 12.

Power amplifier 13 is one example of the first power amplifier, and amplifies a first transmission signal that has been input to the transmission input terminal. Power amplifier 13 is connected between the transmission input terminal and switch 12.

Low-noise amplifier 14 is one example of the first low-noise amplifier, and amplifies a first reception signal that has been input to the transmission and reception terminal. Power amplifier 14 is connected between switch 12 and a reception input terminal.

Switch 12 is one example of the transmission and reception selector switch, and is a switching circuit which exclusively switches between connecting a common terminal to one of selection terminals and connecting the common terminal to the other of the selection terminals.

Transfer circuit 20B is one example of the second transfer circuit, and transfers a second radio-frequency signal of the second communication system. In the present variation, the second communication system is the 5G, and the second radio-frequency signal is a signal of an NR communication band. Transfer circuit 20B includes a transmission and reception terminal, a transmission input terminal, a reception output terminal, duplexer 25, power amplifier 23, and low-noise amplifier 24.

Duplexer 25 includes transmission filter 25T and reception filter 25R. Transmission filter 25T is a bandpass filter which has, as a passband, a transmission band of the second communication band of the second communication system, includes an input terminal connected to an output terminal of power amplifier 23, and includes an output terminal connected to selection terminal 30*d* via the transmission and reception terminal. Reception filter 25R is a bandpass filter which has, as a passband, a reception band of the second communication band of the second communication system, includes an input terminal connected to selection terminal 30*d* via the transmission and reception terminal, and includes an output terminal connected to an input terminal of low-noise amplifier 24.

Power amplifier 23 is one example of the second power amplifier, and amplifies a second transmission signal that has been input to the transmission input terminal.

Low-noise amplifier 24 is one example of the second low-noise amplifier, and amplifies the second reception signal that has been input to the transmission and reception terminal.

With the above-described configuration, transfer circuit 20B outputs the second transmission signal that has been amplified by power amplifier 23, toward antennas 2*a* and 2*b* via transmission filter 25T. In addition, transfer circuit 20B amplifies, by low-noise amplifier 24, the second reception signal that has been received by antennas 2*a* or 2*b* and has passed through reception filter 25R, and outputs the amplified second reception signal toward RFIC 3. Accordingly, transfer circuit 203 executes transmission of the second transmission signal and reception of the second reception signal in a frequency division duplex system (FDD).

Switch 30 is one example of the first switch, and includes antenna terminals 30*a* (the first antenna terminal) and 30*b* (the second antenna terminal), and selection terminals 30*c* (the first selection terminal) and 30*d* (the second selection terminal). Antenna terminal 30*a* is connected to antenna 2*a*, and antenna terminal 30*b* is connected to antenna 2*b*. In addition, selection terminal 30*c* is connected to transfer circuit 10, and selection terminal 30*d* is connected to transfer circuit 20B. It should be noted that, although two selection terminals, namely, selection terminals 30*c* and 30*d*, have been exemplified above, the total number of selection terminals is not limited to two, and may be three or more.

In switch 30, selection between conduction of antenna terminal 30*a* with selection terminal 30*c* and conduction of antenna terminal 30*a* with selection terminal 30*d* is exclusively performed, and selection between conduction of antenna terminal 30b with selection terminal 30c and conduction of antenna terminal 30b with selection terminal 30d is exclusively performed.

With the above-described configuration, switch 30 switches connections between transfer circuits 10 and 20B and antennas 2Pa and 2Pb according to superiority or inferiority of antenna sensitivities of antennas 2Pa and 2Pb. When antenna 2Pa is higher in antenna sensitivity than antenna 2Pb, switch 30 connects antenna terminal 30a to selection terminal 30c, and connects antenna terminal 30b to selection terminal 30d. When antenna 2Pb is higher in antenna sensitivity than antenna 2Pa, switch 30 connects antenna terminal 30a to selection terminal 30d, and connects antenna terminal 30b to selection terminal 30c.

More specifically, when it is determined that antenna 2Pa is higher in antenna sensitivity than antenna 2Pb on the basis of a transmission power value of the first transmission signal and a transmission power value of the second transmission signal which have been transferred from couplers 71 and 72, the controller of RFIC 3 outputs, to switch 30, control signal Ctrl1 for implementing the following connected state. In this case, control signal Ctrl1 is a signal for connecting antenna terminal 30a to selection terminal 30c, and connecting antenna terminal 30b to selection terminal 30d. In contrast, when it is determined that antenna 2Pb is higher in antenna sensitivity than antenna 2Pa on the basis of a transmission power value of the first transmission signal and a transmission power value of the second transmission signal which have been transferred from couplers 71 and 72, the controller of RFIC 3 outputs, to switch 30, control signal Ctrl1 for implementing the following connected state. In this case, control signal Ctrl1 is a signal for connecting antenna terminal 30a to selection terminal 30d, and connecting antenna terminal 30b to selection terminal 30c.

It should be noted that, in radio-frequency front-end circuit 1B and communication device 5B according to the present variation, when it is determined that antenna 2Pa is higher in antenna sensitivity than antenna 2Pb on the basis of a reception power value of the first reception signal and a reception power value of the second reception signal which have been obtained by the RSSI included in RFIC 3, the controller of RFIC 3 may output, to switch 30, control signal Ctrl1 for implementing the following connected state. In this case, control signal Ctrl1 is a signal for connecting antenna terminal 30a to selection terminal 30c, and connecting antenna terminal 30b to selection terminal 30d. In addition, when it is determined that antenna 2Pb is higher in antenna sensitivity than antenna 2Pa on the basis of a reception power value of the first reception signal and a reception power value of the second reception signal which have been obtained by the RSSI, the controller of RFIC 3 may output, to switch 30, control signal Ctrl1 for implementing the following connected state. In this case, control signal Ctrl1 is a signal for connecting antenna terminal 30a to selection terminal 30d, and connecting antenna terminal 30b to selection terminal 30c.

With the above-described configurations of radio-frequency front-end circuit 1B and communication device 5B according to the present variation, transfer circuit 10 for 4G (LTE) is connected to an antenna which is high in antenna sensitivity and transfer circuit 20B for 5G (NR) is connected to an antenna which is low in antenna sensitivity. Accordingly, connection reliability of 4G (LTE) that is to be used for the priority connection is improved. In other words, when simultaneously transferring radio-frequency signals of mutually different 4G (LTE) and 5G (NR), it is possible to dynamically optimize connection between transfer circuits and antennas according to the priority of signal transferring and the superiority or inferiority of antenna sensitivities. Accordingly, the connectivity of a communication line between a communications partner such as a base station and a mobile terminal including the above-described radio-frequency front-end circuit is improved.

It should be noted that, in radio-frequency front-end circuit 1B and communication device 5B according to the present variation, connections between reception circuits 40 and 50 and antennas 2Sa and 2Sb which are secondary antennas may be switched according to superiority or inferiority in antenna sensitivities of antennas 2Sa and 2Sb, in the same manner as radio-frequency front-end circuit 1A and communication device 5A according to the working example.

In addition, a configuration in which the first transfer circuit that transfers a radio-frequency signal of the first communication system executes transmission and reception in the TDD system, and the second transfer circuit that transfers a radio-frequency signal of the second communication system executes transmission and reception in the FDD system, in radio-frequency front-end circuit 1B and communication device 5B according to the present variation, has been described hereinbefore. However, the radio-frequency front-end circuit and the communication device according to the present disclosure may have a configuration in which the first transfer circuit that transfers a radio-frequency signal of the first communication system executes transmission and reception in the FDD system, and the second transfer circuit that transfers a radio-frequency signal of the second communication system executes transmission and reception in the TDD system. Furthermore, the radio-frequency front-end circuit and the communication device according to the present disclosure may have a configuration in which the first transfer circuit that transfers a radio-frequency signal of the first communication system executes transmission and reception in the FDD system, and the second transfer circuit that transfers a radio-frequency signal of the second communication system executes transmission and reception in the FDD system.

With these configurations as well, the first transfer circuit for 4G (LTE) is connected to an antenna which is high in antenna sensitivity, and the second transfer circuit for 5G (NR) is connected to an antenna which is low in antenna sensitivity, and thus the connection reliability of 4G (LTE) that is to be used for the priority connection is improved. More specifically, when simultaneously transferring radio-frequency signals of mutually different 4G (LTE) and 5G (NR), connection between transfer circuits and antennas can be dynamically optimized according to the priority of signal transferring and the superiority or inferiority of antenna sensitivities. It is thus possible to improve connectivity of a communication line between a communications partner such as a base station and a mobile terminal including the above-described radio-frequency front-end circuit.

[4. Configuration of Radio-Frequency Front-End Circuit 1C and Communication Device 5C According to Variation 2]

Figure 6:
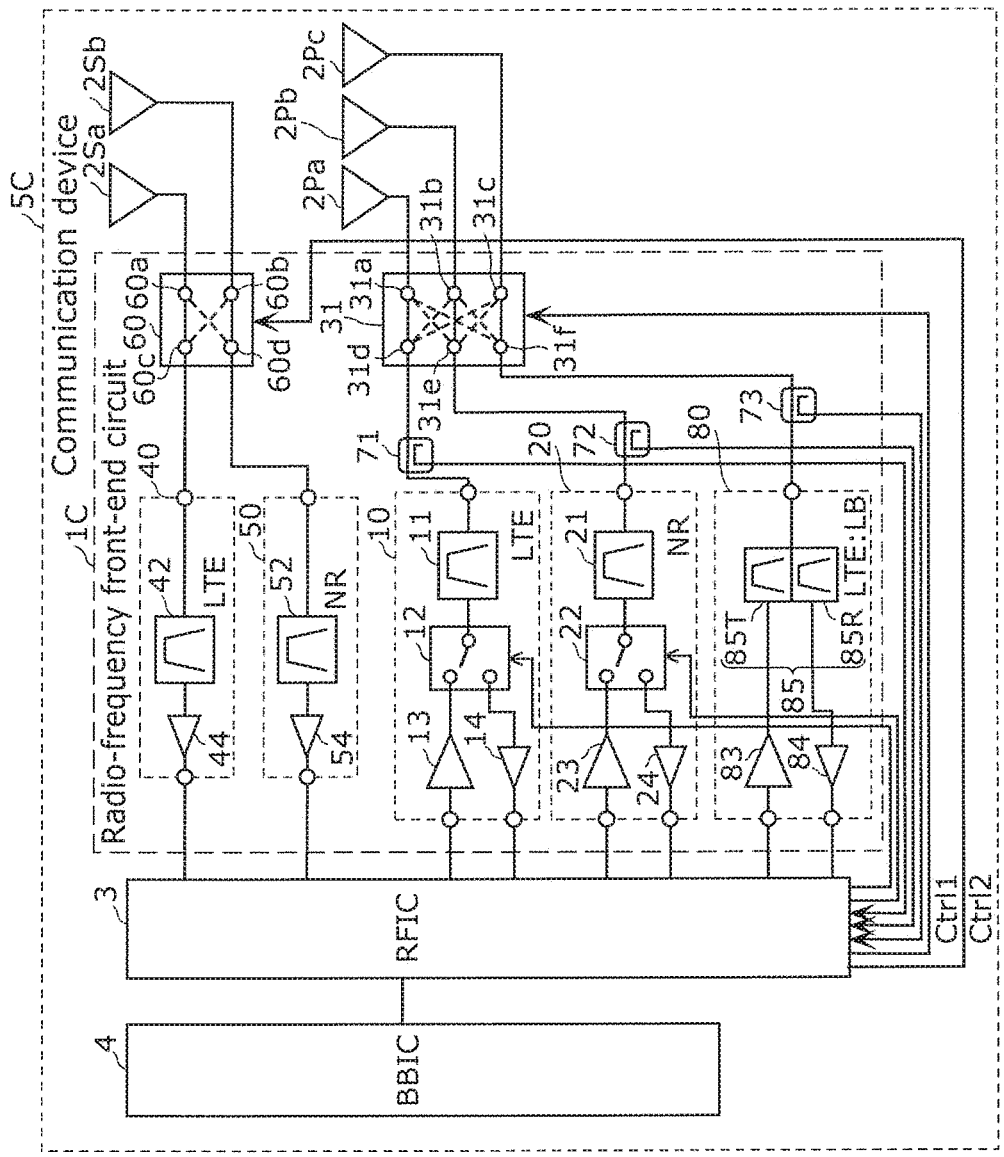
FIG. 6 is a diagram illustrating a circuit configuration of a radio-frequency front-end circuit and a communication device according to Variation 2.

FIG. 6 is a diagram illustrating a circuit configuration of radio-frequency front-end circuit 1C and communication device 5C according to Variation 2. Radio-frequency front-end circuit 1C and communication device 5C according to the present variation are one working examples of radio-frequency front-end circuit 1 and communication device 5 according to the embodiment, in which 4G is applied as the first communication system and 5G is applied as the second communication system. Radio-frequency front-end circuit 1C and communication device 5C according to the present variation are different from radio-frequency front-end circuit 1A and communication device 5A according to the working example in that a third transfer circuit is included. In the following, description of the configurations of radio-frequency front-end circuit 1C and communication device 5C according to the present variation that are the same as the configurations of radio-frequency front-end circuit 1A and communication device 5A according to the working example will be omitted, and description will be centered on a different configuration.

As illustrated in FIG. 6, communication device 5C includes radio-frequency front-end circuit 1C, antennas 2Pa, 2Pb, 2Pc, 2Sa, and 2Sb, RFIC 3, and BBIC 4.

Radio-frequency front-end circuit 1C includes transfer circuits 10, 20, and 80, reception circuits 40 and 50, switches 31 and 60, and couplers 71, 72, and 73.

Transfer circuit 10 is one example of the first transfer circuit, and transfers a first radio-frequency signal of the first communication system (4G). Transfer circuit 10 is connected to selection terminal 31*d* of switch 31. Transfer circuit 10 transfers, for example, a first radio-frequency signal of 4G (LTE) Band 41 (transmission and reception band: 2496 MHz to 2690 MHz, the first communication band).

Transfer circuit 20 is one example of the second transfer circuit, and transfers a second radio-frequency signal of the second communication system (5G). Transfer circuit 20 is connected to selection terminal 31*e* of switch 31. Transfer circuit 20 transfers, for example, a second radio-frequency signal of 5G (NR) n 41 (transmission and reception band: 2496 MHz to 2690 MHz, the second communication band).

Transfer circuit 80 is one example of the third transfer circuit, and transfers a third radio-frequency signal of the third communication system. Transfer circuit 80 is connected to selection terminal 31*f* of switch 31. According to the present variation, the third communication system is the 4G as with the first communication system, and the third radio-frequency signal is a signal of an LTE communication band. Transfer circuit 80 transfers, for example, a third radio-frequency signal of 4G (LTE) Band 5 (transmission band: 824 MHz to 849 MHz, reception band: 869 MHz to 894 MHz). Transfer circuit 80 includes a transmission and reception terminal, a transmission input terminal, a reception output terminal, duplexer 85, power amplifier 83, and low-noise amplifier 84.

Duplexer 85 includes transmission filter 85T and reception filter 85R. Transmission filter 85T is a bandpass filter which has, as a passband, a transmission band of a third communication band of the third communication system, includes an input terminal connected to an output terminal of power amplifier 83, and includes an output terminal connected to selection terminal 31*f* via the transmission and reception terminal. Reception filter 85R is a bandpass filter which has, as a passband, a reception band of a third communication band of the third communication system, includes an input terminal connected to selection terminal 31*f* via the transmission and reception terminal, and includes an output terminal connected to an input terminal of low-noise amplifier 84.

Power amplifier 83 amplifies a third radio-frequency signal that has been input to the transmission input terminal. Low-noise amplifier 84 amplifies a third radio-frequency signal that has been input to the transmission input terminal.

With the above-described configuration, transfer circuit 80 outputs the third radio-frequency signal amplified by power amplifier 23 toward antennas 2*a*, 2*b*, and 2*c* via transmission filter 85T. Furthermore, transfer circuit 80 amplifies, by low-noise amplifier 84, the third radio-frequency signal that has been received by antennas 2*a*, 2*b*, or 2*c* and has passed through reception filter 85R, and outputs the amplified third radio-frequency signal toward RFIC 3. In other words, transfer circuit 80 executes transmission and reception of the third radio-frequency signal in the FDD system.

In radio-frequency front-end circuit 1C and communication device 5C according to the present variation, a second radio-frequency signal of the second communication system includes user data of the second communication system. In addition, a third radio-frequency signal of the third communication system includes user data of the third communication system. In addition, a first radio-frequency signal of the first communication system includes communication control data for enabling transferring the user data of the second communication system by transfer circuit 20, and user data of the first communication system.

Switch 31 is one example of the first switch, and includes antenna terminal 31*a* (first antenna terminal), antenna terminal 31*b* (second antenna terminal), antenna terminal 31*c* (fifth antenna terminal), selection terminal 31*d* (first selection terminal), selection terminal 31*e* (second selection terminal), and selection terminal 31*f* (fifth selection terminal). Antenna terminal 31*a* is connected to antenna 2Pa, antenna terminal 31*b* is connected to antenna 2Pb, and antenna terminal 31*c* is connected to antenna 2Pc. In addition, selection terminal 31*d* is connected to transfer circuit 10, selection terminal 31*e* is connected to transfer circuit 20, and selection terminal 31*f* is connected to transfer circuit 80. It should be noted that, although three selection terminals, namely, selection terminals 31*d*, 31*e*, and 31*f*, have been exemplified above, the total number of selection terminals is not limited to three, and may be four or more.

Antenna 2Pa is one example of the first antenna, and connected to antenna terminal 31*a*. Antenna 2Pb is one example of the second antenna, and connected to antenna terminal 31*b*. Antenna 2Pc is one example of the fifth antenna, and connected to antenna terminal 31*c*. Antennas 2Pa, 2Pb, and 2Pc emit or receive 4G and 5G radio-frequency signals.

It should be noted that antennas 2Pa, 2Pb, and 2Pc are primary antennas which are used in preference to antennas 2Sa and 2Sb in view of an antenna performance, etc. In contrast, antennas 2Sa and 2Sb are secondary antennas for receiving only.

Coupler 71 is disposed on a path connecting transfer circuit 10 and selection terminal 31*d* of switch 31, and measures a transmission power value of the first radio-frequency signal output from transfer circuit 10.

Coupler 72 is disposed on a path connecting transfer circuit 20 and selection terminal 31*e* of switch 31, and measures a transmission power value of the second radio-frequency signal output from transfer circuit 20.

Coupler 73 is disposed on a path connecting transfer circuit 80 and selection terminal 31*f* of switch 31, and measures a transmission power value of the third radio-frequency signal output from transfer circuit 80. The measured transmission power value of the third radio-frequency signal is transferred to the controller of RFIC 3. It should be noted that, when selection terminal 31*f* and antenna terminal 31*a* are connected, the greater the transmission power value measured by coupler 73 is, the lower the antenna sensitivity of antenna 2Pa for the third radio-frequency signal is, and the smaller the transmission power value measured by coupler 73 is, the higher the antenna sensitivity of antenna 2Pa for the third radio-frequency signal is. In addition, when selection terminal 31*f* and antenna terminal 31*b* are connected, the greater the transmission power value measured by coupler 73 is, the lower the antenna sensitivity of antenna 2Pb for the third radio-frequency signal is, and the smaller the transmission power value measured by coupler 73 is, the higher the antenna sensitivity of antenna 2Pb for the third radio-frequency signal is. In addition, when selection terminal 31*f* and antenna terminal 31*c* are connected, the greater the transmission power value measured by coupler 73 is, the lower the antenna sensitivity of antenna 2Pc for the third radio-frequency signal is, and the smaller the transmission power value measured by coupler 73 is, the higher the antenna sensitivity of antenna 2Pc for the third radio-frequency signal is. It should be noted that coupler 73 may be disposed on a path connecting antenna terminal 31*c* of switch 31 and antenna 2Pc. In this case, coupler 73 measures a transmission power value of the third radio-frequency signal output from transfer circuit 10, 20, or 80 according to the connected state of switch 31.

With the above-described configuration, switch 31 switches connections between transfer circuits 10, 20, and 80 and antennas 2Pa, 2Pb, and 2Pc according to superiority or inferiority of antenna sensitivities of antennas 2Pa, 2Pb, and 2Pc. Switch 31 connects selection terminal 31*d* to an antenna which is the highest in antenna sensitivity among antennas 2Pa, 2Pb, and 2Pc.

More specifically, when it is determined that antenna 2Pa is the highest in antenna sensitivity among antennas 2Pa, 2Pb, and 2Pc on the basis of the transmission power values of the radio-frequency signals transferred from couplers 71, 72, and 73, the controller of RFIC 3 outputs to, switch 31, control signal Ctrl1 for implementing the following connected state. In this case, control signal Ctrl1 connects antenna terminal 31*a* to selection terminal 31*d*, connects antenna terminal 31*b* to one of selection terminals 31*e* and 31*f*, and connects antenna terminal 31*c* to the other of selection terminals 31*e* and 31*f*. In addition, when it is determined that antenna 2Pb is the highest in antenna sensitivity among antennas 2Pa, 2Pb, and 2Pc on the basis of the transmission power values of the radio-frequency signals transferred from couplers 71, 72, and 73, the controller of RFIC 3 outputs to, switch 31, control signal Ctrl1 for implementing the following connected state. In this case, control signal Ctrl1 connects antenna terminal 31*b* to selection terminal 31*d*, connects antenna terminal 31*a* to one of selection terminals 31*e* and 31*f*, and connects antenna terminal 31*c* to the other of selection terminals 31*e* and 31*f*. In addition, when it is determined that antenna 2Pc is the highest in antenna sensitivity among antennas 2Pa, 2Pb, and 2Pc on the basis of the transmission power values of the radio-frequency signals transferred from couplers 71, 72, and 73, the controller of RFIC 3 outputs to, switch 31, control signal Ctrl1 for implementing the following connected state. In this case, control signal Ctrl1 connects antenna terminal 31*c* to selection terminal 31*d*, connects antenna terminal 31*a* to one of selection terminals 31*e* and 31*f*, and connects antenna terminal 31*b* to the other of selection terminals 31*e* and 31*f*.

With the above-described configuration of radio-frequency front-end circuit 1C and communication device 5C according to the present variation, transfer circuit 10 that transfers a 4G (LTE) radio-frequency signal including 5G communication control information is connected to an antenna which is the highest in antenna sensitivity, and transfer circuit 20 for 5G (NR) and transfer circuit 80 for 4G (LTE) are connected to the other antennas, and thus connection reliability of 4G (LTE) that is to be used for the priority connection is improved. Furthermore, it is possible to simultaneously transfer radio-frequency signals of the first communication band and the third communication band which are of the same 4G (LTE) (carrier aggregation (CA)). More specifically, when simultaneously transferring radio-frequency signals of mutually different 4G (LTE) and 5G (NR) while executing 4G (LTE) CA, connection between transfer circuits and antennas can be dynamically optimized according to the priority of signal transferring and the superiority or inferiority of antenna sensitivities. It is thus possible to improve connectivity of a communication line between a communications partner such as a base station and a mobile terminal including the above-described radio-frequency front-end circuit.

It should be noted that, when radio-frequency signals of the first communication band and the third communication band which are of the same 4G (LTE) are not simultaneously transferred, switch 31 connects selection terminal 31*d* to an antenna which is the highest in antenna sensitivity among antennas 2Pa, 2Pb, and 2Pc, and connects selection terminal 31*e* to one of the other antennas. However, selection terminal 31*f* need not be connected to any of the antennas.

It should be noted that, with radio-frequency front-end circuit 1C and communication device 5C according to the present variation as well, in the same manner as the working example and Variation 1, the controller of RFIC 3 may measure the antenna sensitivity of each of antennas 2Pa, 2Pb, and 2Pc on the basis of the reception power value of the radio-frequency signal obtained by the RSSI included in RFIC 3.

In addition, the third communication band of the third radio-frequency signals transferred through transfer circuit 80 need not be the communication band of the first communication system (4G), and may be a communication band of the second communication system (5G). Furthermore, the third communication band is not limited to the LTE Band 5.

In addition, transfer circuit 80 may have a configuration that executes transmission and reception in a TDD system.

[5. Configuration of Radio-Frequency Front-End Circuit 1D and Communication Device 5D According to Variation 3]

Figure 7:
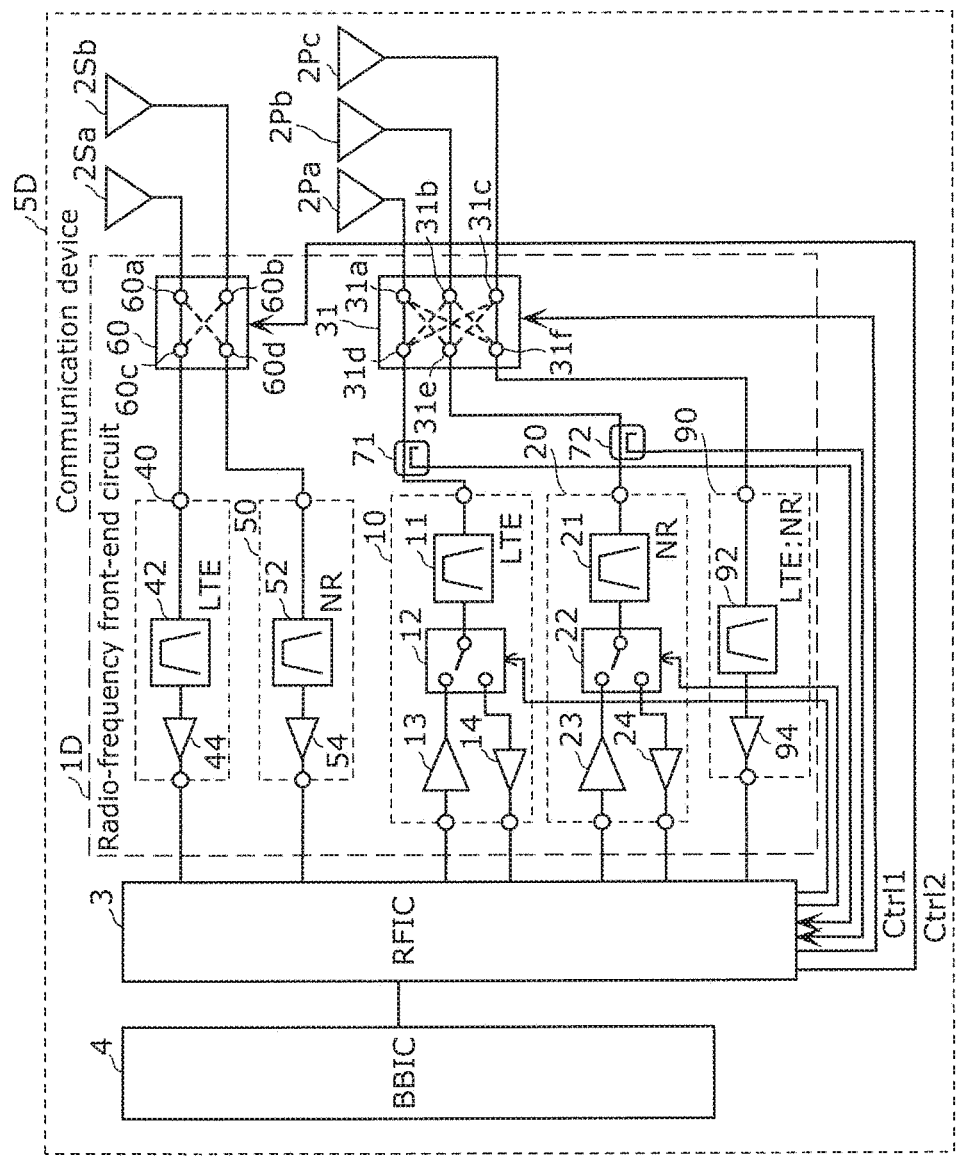
FIG. 7 is a diagram illustrating a circuit configuration of a radio-frequency front-end circuit and a communication device according to Variation 3.

FIG. 7 is a diagram illustrating a circuit configuration of radio-frequency front-end circuit 1D and communication device 5D according to Variation 3. Radio-frequency front-end circuit 1D and communication device 5D according to the present variation are one working examples of radio-frequency front-end circuit 1 and communication device 5 according to the embodiment, in which 4G is applied as the first communication system and 5G is applied as the second communication system. Radio-frequency front-end circuit 1D and communication device 5D according to the present variation are different from radio-frequency front-end circuit 1C and communication device 5C according to Variation 2 in that the third transfer circuit is a reception circuit. In the following, description of the configurations of radio-frequency front-end circuit 1D and communication device 5D according to the present variation that are the same as the configurations of radio-frequency front-end circuit 1C and communication device 5C according to Variation 2 will be omitted, and description will be centered on a different configuration.

As illustrated in FIG. 7, communication device 5D includes radio-frequency front-end circuit 1D, antennas 2Pa, 2Pb, 2Pc, and 2Sa, and 2Sb, RFIC 3, and BBIC 4.

Radio-frequency front-end circuit 1D includes transfer circuits 10 and 20, reception circuits 40, 50, and 90, switches 31 and 60, and couplers 71, and 72.

Transfer circuit 90 is one example of the third transfer circuit, and receives a third reception signal of the third communication system. Reception circuit 90 is connected to selection terminal 31f of switch 31. According to the present variation, the third communication system is the 4G as with the first communication system, and the third reception is a signal of an LTE communication band. Reception circuit 90 transfers, for example, a third reception signal of 4G (LTE) Band 1 (reception band: 2110 MHz to 2170 MHz). It should be noted that, the third communication system may be the 5G as with the second communication system, and the third reception signal may be a signal of an NR communication band. In this case, reception circuit 90 transfers, for example, a third reception signal of 5G (NR) n 1 (reception band: 2110 MHz to 2170 MHz).

Reception circuit 90 includes an input terminal, an output terminal, filter 92, and low-noise amplifier 94.

Filter 92 is, for example, a bandpass filter having, as a passband, a 4G (LTE) third communication band, and connected between the input terminal and low-noise amplifier 94.

Low-noise amplifier 94 preferentially amplifies, for example, a reception signal of the 4G (LTE) third communication band. Low-noise amplifier 94 is connected between filter 92 and an output terminal.

With the above-described configuration of radio-frequency front-end circuit 1D and communication device 5D according to the present variation, transfer circuit 10 that transfers a 4G (LTE) radio-frequency signal including 5G communication control information is connected to an antenna that is highest in antenna sensitivity, and transfer circuit 20 for 5G (NR) and reception circuit 90 for 4G (LTE) are connected to the other antennas, and thus connection reliability of 4G (LTE) that is to be used for the priority connection is improved. Furthermore, it is possible to simultaneously receive radio-frequency signals of the first communication band and the third communication band which are of the same 4G (LTE) (CA), More specifically, when simultaneously transferring radio-frequency signals of mutually different 4G (LTE) and 5G (NR) while executing 4G (LTE) CA, connection between transfer circuits and antennas can be dynamically optimized according to the priority of signal transferring and the superiority or inferiority of antenna sensitivities. It is thus possible to improve connectivity of a communication line between a communications partner such as a base station and a mobile terminal including the above-described radio-frequency front-end circuit.

It should be noted that, with radio-frequency front-end circuit 1D and communication device 5D according to the present variation as well, in the same manner as the working example, Variation 1, and Variation 2, the controller of RFIC 3 may measure the antenna sensitivity of each of antennas 2Pa, 2Pb, and 2Pc on the basis of the reception power value of the radio-frequency signal obtained by the RSSI included in RFIC 3.

Furthermore, the third communication band is not limited to the LTE Band 1 or NR n1.

Other Embodiments

Although the radio-frequency front-end circuit and the communication device according to the present disclosure have been described above based on the embodiment, the working example, and the variations thereof, the radio-frequency front-end circuit and the communication device according to the present disclosure are not limited to the foregoing embodiment, working example, and variations thereof. The present disclosure also encompasses other embodiments achieved by combining arbitrary structural components in the above-described embodiment, working example, and variations thereof, variations resulting from various modifications to the above-described embodiment, working example, and variations thereof that may be conceived by those skilled in the art without departing from the essence of the present disclosure, and various devices that include the radio-frequency front-end circuit and the communication device according to the above embodiment, working example, and variations thereof.

It should be noted that the radio-frequency front-end circuit and the communication device according to the foregoing embodiment, working example, and variations thereof are applied to a communication system such as 3GPP as described above, and are typically applied to a system that simultaneously transfers a 4G (LTE) radio-frequency signal and a 5G (NR) radio-frequency signal as illustrated in the working example. For example, the following can be given as examples of a combination of 4G (LTE)/5G (NR): (1) Band 41/n 41 which is described in the working example, (2) Band 71/n71, (3) Band 3/n 3, etc.

Furthermore, the radio-frequency front-end circuit and the communication device according to the foregoing embodiment, working example, and variations thereof can be applied to a system that simultaneously transfers a 4G (LTE) first communication band and a 5G (NR) second communication band of different frequency bands. In addition, for the radio-frequency front-end circuit and the communication device according to the foregoing embodiment, working example, and variations thereof, the following can be given as examples of a first communication band/second communication band combination: (1) 4G-LTE licensed band/wireless local area network (WLAN); (2) 4G-LTE unlicensed band (4G-LTE-U)/WLAN; (3) 5G-NR licensed band/WLAN; (4) 5G-NR unlicensed band (5G-NR-U)/WLAN; and (5) licensed band/unlicensed band.

Furthermore, although in the foregoing embodiment, working example, and variations thereof, configurations for the case of simultaneously using two different communication bands and three different communication bands were given as examples, the radio-frequency front-end circuit and the communication device according to the present disclosure can also be applied to a configuration for the case of simultaneously using four or more different communication bands. In other words, a radio-frequency front-end circuit and communication device that simultaneously use four or more different communication bands and have the configurations of the radio-frequency front-end circuit and communication device according to the foregoing embodiment, working example, and variations thereof are also included in the present disclosure.

Furthermore, for example, in the radio-frequency front-end circuit and communication device according to the foregoing embodiment, working example, and variations thereof, another radio-frequency front-end circuit element and wiring, for example, may be inserted in a path connecting circuit elements and a signal path which are disclosed in the drawings.

Furthermore, the controller according to the present disclosure may be realized as an integrated circuit (IC) or large scale integration (LSI). Furthermore, the method of implementation of structural components using an integrated circuit may be realized using a dedicated circuit or a general-purpose processor. A field programmable gate array (FPGA) that allows for programming after the manufacture of an LSI, or a reconfigurable processor that allows for reconfiguration of the connection and the setting of circuit cells inside an LSI may be employed. When circuit integration technology that replaces LSIs comes along owing to advances of the semiconductor technology or to a separate derivative technology, the function blocks may understandably be integrated using that technology.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be widely used in communication apparatuses such as a mobile phone, as a radio-frequency front-end circuit and a communication device that simultaneously transfer radio-frequency signals of two or more different communication systems.

The invention claimed is:

1. A radio-frequency front-end circuit configured to simultaneously transfer a first radio-frequency signal of a first communication system and a second radio-frequency signal of a second communication system, the second communication system being different than the first communication system, the radio-frequency front-end circuit comprising:
    a first transfer circuit configured to transfer the first radio-frequency signal; and
    a first switch comprising a first antenna terminal connected to a first antenna, a second antenna terminal connected to a second antenna, and at least two selection terminals, the second antenna being different than the first antenna, wherein:
    the at least two selection terminals of the first switch comprise a first selection terminal connected to the first transfer circuit, and a second selection terminal connected to a second transfer circuit, the second transfer circuit being configured to transfer the second radio-frequency signal,
    the first switch is configured to:
        when the first antenna has a higher sensitivity than the second antenna, connect the first antenna terminal to the first selection terminal, and connect the second antenna terminal to the second selection terminal; and
        when the second antenna has a higher sensitivity than the first antenna, connect the first antenna terminal to the second selection terminal, and connect the second antenna terminal to the first selection terminal,
    the second radio-frequency signal includes user data of the second communication system, and
    the first radio-frequency signal includes communication control data for enabling transfer of the user data of the second communication system via the second transfer circuit.

2. The radio-frequency front-end circuit according to claim 1, wherein:
    the first transfer circuit comprises a first power amplifier configured to amplify the first radio-frequency signal, and to output a first amplified radio-frequency signal, the first amplified radio-frequency signal being transmitted by the first antenna or the second antenna, and
    the second transfer circuit comprises a second power amplifier configured to amplify the second radio-frequency signal, and to output a second amplified radio-frequency signal, the second amplified radio-frequency signal being transmitted by the first antenna or the second antenna.

3. The radio-frequency front-end circuit according to claim 1, wherein:
    the first transfer circuit comprises a first low-noise amplifier configured to amplify the first radio-frequency signal, the first radio-frequency signal being received from the first antenna or the second antenna, and
    the second transfer circuit comprises a second low-noise amplifier configured to amplify the second radio-frequency signal, the second radio-frequency signal being received from the first antenna or the second antenna.

4. The radio-frequency front-end circuit according to claim 1, further comprising:
    the second transfer circuit.

5. The radio-frequency front-end circuit according to claim 4, wherein:
    the first transfer circuit comprises a first power amplifier configured to amplify the first radio-frequency signal, and to output a first amplified radio-frequency signal, the first amplified radio-frequency signal being transmitted by the first antenna or the second antenna,
    the second transfer circuit comprises a second power amplifier configured to amplify the second radio-frequency signal, and to output a second amplified radio-frequency signal, the second amplified radio-frequency signal being transmitted by the first antenna or the second antenna,
    the radio-frequency front-end circuit further comprises:
        a first reception circuit configured to transfer a first reception signal of the first communication system;
        a second reception circuit configured to transfer a second reception signal of the second communication system; and
        a second switch comprising a third antenna terminal connected to a third antenna, a fourth antenna terminal connected to a fourth antenna, and at least two selection terminals, the fourth antenna being different than the third antenna,
    the at least two selection terminals of the second switch comprise a third selection terminal connected to the first reception circuit, and a fourth selection terminal connected to the second reception circuit, and
    the second switch is configured to:
        when the third antenna has a higher sensitivity than the fourth antenna, connect the third antenna terminal to the third selection terminal, and connect the fourth antenna terminal to the fourth selection terminal; and
        when the fourth antenna has a higher sensitivity than the third antenna, connect the third antenna terminal to the fourth selection terminal, and connect the fourth antenna terminal to the third selection terminal.

6. The radio-frequency front-end circuit according to claim 4, further comprising:
    a third transfer circuit configured to transfer a third radio-frequency signal of a third communication system, wherein:
    the at least two selection terminals of the first switch comprises a fifth selection terminal connected to the third transfer circuit,
    the third radio-frequency signal includes user data of the third communication system, and the first switch further comprises a fifth antenna terminal connected to a fifth antenna, the fifth antenna being different from the first antenna and the second antenna.

7. The radio-frequency front-end circuit according to claim 6, wherein:
the third communication system is the same as the first communication system,
the first radio-frequency signal is of a first communication band stipulated in the first communication system,
the third radio-frequency signal is of a third communication band stipulated in the first communication system, the third communication band being different than the first communication band, and
the first switch is configured to:
connect the first selection terminal to a most sensitive antenna among the first antenna, the second antenna, and the fifth antenna,
connect the second selection terminal to one of the first antenna, the second antenna, and the fifth antenna, other than the most sensitive antenna, and
connect the fifth selection terminal to another of the first antenna, the second antenna, and the fifth antenna, other than the most sensitive antenna and the antenna connected to the second selection terminal.

8. The radio-frequency front-end circuit according to claim 1, wherein:
the first communication system is a fourth generation communication system (4G), and
the second communication system is a fifth generation communication system (5G).

9. The radio-frequency front-end circuit according to claim 8, wherein:
the first radio-frequency signal is a signal of a first communication band stipulated in the fourth communication system, and
the second radio-frequency signal is a signal of a second communication band that is stipulated in the fifth generation communication system and that has a frequency range identical to a frequency range of the first communication band.

10. A communication device, comprising:
the radio-frequency front-end circuit according to claim 1;
the first antenna and the second antenna; and
a radio-frequency (RF) signal processing circuit configured to process the first radio-frequency signal or the second radio-frequency signal transmitted or received by the first antenna or the second antenna,
wherein the radio frequency front-end circuit is configured to transfer the first and second radio-frequency signals between the first antenna, the second antenna, and the RF signal processing circuit.

11. A radio-frequency front-end circuit, configured to simultaneously transfer a first radio-frequency signal of a first communication system and a second radio-frequency signal of a second communication system, the second communication system being different than the first communication system, the radio-frequency front-end circuit comprising:
a first transfer circuit configured to transfer the first radio-frequency signal;
a second transfer circuit configured to transfer the second radio-frequency signal; and
a first switch comprising a first antenna terminal connected to a first antenna, a second antenna terminal connected to a second antenna, and at least two selection terminals, the second antenna being different than the first antenna,
wherein the at least two selection terminals of the first switch comprise a first selection terminal connected to the first transfer circuit, and a second selection terminal connected to the second transfer circuit,
wherein the first switch is configured to:
when the first antenna has a higher sensitivity than the second antenna, connect the first antenna terminal to the first selection terminal, and connect the second antenna terminal to the second selection terminal; and
when the second antenna has a higher sensitivity than the first antenna, connect the first antenna terminal to the second selection terminal, and connect the second antenna terminal to the first selection terminal,
wherein the first transfer circuit comprises:
a first power amplifier configured to amplify the first radio-frequency signal of the first communication system;
a first low-noise amplifier configured to amplify the first radio-frequency signal of the first communication system; and
a transmission and reception selector switch configured to exclusively switch between connecting an output terminal of the first power amplifier to the first selection terminal, and connecting an input terminal of the first low-noise amplifier to the first selection terminal, and
wherein the second transfer circuit comprises:
a second power amplifier configured to amplify the second radio-frequency signal of the second communication system;
a second low-noise amplifier configured to amplify the second radio-frequency signal of the second communication system;
a transmission filter comprising an input terminal connected to an output terminal of the second power amplifier, and an output terminal connected to the second selection terminal; and
a reception filter comprising an output terminal connected to an input terminal of the second low-noise amplifier, and an input terminal connected to the second selection terminal.

12. The radio-frequency front-end circuit according to claim 11,
wherein the second radio-frequency signal includes user data of the second communication system, and
wherein the first radio-frequency signal includes communication control data for enabling transfer of the user data of the second communication system via the second transfer circuit.

13. The radio-frequency front-end circuit according to claim 11, wherein:
the first communication system is a fourth generation communication system (4G), and
the second communication system is a fifth generation communication system (5G).

14. The radio-frequency front-end circuit according to claim 13, wherein:
the first radio-frequency signal is a signal of a first communication band stipulated in the fourth communication system, and
the second radio-frequency signal is a signal of a second communication band that is stipulated in the fifth generation communication system and that has a frequency range identical to a frequency range of the first communication band.

15. A communication device, comprising:
the radio-frequency front-end circuit according to claim 11;
the first antenna and the second antenna; and
a radio-frequency (RF) signal processing circuit configured to process the first radio-frequency signal or the second radio-frequency signal transmitted or received by the first antenna or the second antenna,
wherein the radio frequency front-end circuit is configured to transfer the first and second radio-frequency signals between the first antenna, the second antenna, and the RF signal processing circuit.

16. A radio-frequency front-end circuit, configured to simultaneously transfer a first radio-frequency signal of a first communication system and a second radio-frequency signal of a second communication system, the second communication system being different than the first communication system, the radio-frequency front-end circuit comprising:
a first transfer circuit configured to transfer the first radio-frequency signal;
a second transfer circuit configured to transfer the second radio-frequency signal; and
a first switch comprising a first antenna terminal connected to a first antenna, a second antenna terminal connected to a second antenna, and at least two selection terminals, the second antenna being different than the first antenna,
wherein the at least two selection terminals of the first switch comprise a first selection terminal connected to the first transfer circuit, and a second selection terminal connected to the second transfer circuit,
wherein the first switch is configured to:
when the first antenna has a higher sensitivity than the second antenna, connect the first antenna terminal to the first selection terminal, and connect the second antenna terminal to the second selection terminal; and
when the second antenna has a higher sensitivity than the first antenna, connect the first antenna terminal to the second selection terminal, and connect the second antenna terminal to the first selection terminal,
wherein the second transfer circuit comprises:
a second power amplifier configured to amplify the second radio-frequency signal of the second communication system;
a second low-noise amplifier configured to amplify the second radio-frequency signal of the second communication system; and
a transmission and reception selector switch configured to exclusively switch between connecting an output terminal of the second power amplifier to the second selection terminal, and connecting an input terminal of the second low-noise amplifier to the second selection terminal, and wherein the first transfer circuit comprises:
a first power amplifier configured to amplify the first radio-frequency signal of the first communication system;
a first low-noise amplifier configured to amplify the first radio-frequency signal of the first communication system;
a transmission filter comprising an input terminal connected to an output terminal of the first power amplifier, and an output terminal connected to the first selection terminal; and
a reception filter comprising an output terminal connected to an input terminal of the first low-noise amplifier, and an input terminal connected to the first selection terminal.

17. The radio-frequency front-end circuit according to claim 16,
wherein the second radio-frequency signal includes user data of the second communication system, and
wherein the first radio-frequency signal includes communication control data for enabling transfer of the user data of the second communication system via the second transfer circuit.

18. The radio-frequency front-end circuit according to claim 16, wherein:
the first communication system is a fourth generation communication system (4G), and
the second communication system is a fifth generation communication system (5G).

19. The radio-frequency front-end circuit according to claim 18, wherein:
the first radio-frequency signal is a signal of a first communication band stipulated in the fourth communication system, and
the second radio-frequency signal is a signal of a second communication band that is stipulated in the fifth generation communication system and that has a frequency range identical to a frequency range of the first communication band.

20. A communication device, comprising:
the radio-frequency front-end circuit according to claim 16;
the first antenna and the second antenna; and
a radio-frequency (RF) signal processing circuit configured to process the first radio-frequency signal or the second radio-frequency signal transmitted or received by the first antenna or the second antenna,
wherein the radio frequency front-end circuit is configured to transfer the first and second radio-frequency signals between the first antenna, the second antenna, and the RF signal processing circuit.

* * * * *

UNITED STATES PATENT AND TRADEMARK OFFICE
CERTIFICATE OF CORRECTION

PATENT NO. : 11,374,608 B2
APPLICATION NO. : 16/830902
DATED : June 28, 2022
INVENTOR(S) : Atsushi Ono It is certified that error appears in the above-identified patent and that said Letters Patent is hereby corrected as shown below:

In the Specification

Column 13, Line 26:
"circuit 113 and" should be --circuit 1B and--

Column 13, Line 28:
"circuit 13 and communication" should be --circuit 1B and communication--

Column 13, Line 47:
"circuit 113, antennas" should be --circuit 1B, antennas--

Column 14, Line 49:
"circuit 203 executes" should be --circuit 20B executes--

Signed and Sealed this
Eighteenth Day of April, 2023

Katherine Kelly Vidal
*Director of the United States Patent and Trademark Office*